US012585511B2

(12) United States Patent
    Law

(10) Patent No.: US 12,585,511 B2
(45) Date of Patent: Mar. 24, 2026

(54) FLOW CONFIGURABLE EVENT-DRIVEN MICROSERVICES

(71) Applicant: Accenture Global Solutions Limited, Dublin (IE)

(72) Inventor: Chun Wah Eric Law, Hayward, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 434 days.

(21) Appl. No.: 18/459,307

(22) Filed: Aug. 31, 2023

(65) Prior Publication Data

US 2024/0103941 A1     Mar. 28, 2024

Related U.S. Application Data

(60) Provisional application No. 63/410,768, filed on Sep. 28, 2022.

(51) Int. Cl.
    *G06F 9/50*       (2006.01)
    *G06F 9/54*       (2006.01)
(52) U.S. Cl.
    CPC .............. *G06F 9/542* (2013.01); *G06F 9/547* (2013.01)
(58) Field of Classification Search
    CPC ........ G06F 9/542; G06F 9/547; G06F 9/4494; G06F 21/554; G06F 9/50
    See application file for complete search history.

(56) References Cited

U.S. PATENT DOCUMENTS

| | | | | |
|---|---|---|---|---|
| 12,360,829 | B1 * | 7/2025 | Pinski | .................... G06F 9/542 |
| 2020/0012545 | A1 * | 1/2020 | Zhang | .................... G06F 9/542 |
| 2020/0167150 | A1 * | 5/2020 | Marriner | ............. G06F 9/44536 |
| 2023/0173395 | A1 * | 6/2023 | Cella | ................... G06N 3/0455 |
| | | | | 463/25 |

(Continued)

OTHER PUBLICATIONS

K. Kritikos, Task Model-Driven Realization of Interactive Application Functionality through Services, 2014, ACM (Year: 2014).*

(Continued)

*Primary Examiner* — Dong U Kim
(74) *Attorney, Agent, or Firm* — Mannava & Kang, P.C

(57) ABSTRACT

Systems and methods for managing flow configurable event-driven microservices are disclosed. A system provides, for each function in sequence of steps corresponding to transaction flow associated with model of event-driven microservices, an address of associated memory space using route name. The system connects each function with another function in memory space and/or different application instances with automatic service discovery. The system transports, for event-driven microservices, an input and/or output comprising message and/or an event comprising object corresponding to payload, in an event envelope, based on a configuration file/a configuration file-like handle. Additionally, the system executes a sequence of steps connecting each function in sequential mode or parallel mode, based on a configuration file/a configuration file-like handle. The system performs data mapping between transaction data states ('stateful data model') in a transaction and input/output of each function that is connected in two or more steps in single transaction.

20 Claims, 11 Drawing Sheets

100

(56) References Cited

U.S. PATENT DOCUMENTS

| 2024/0029047 A1 * | 1/2024 | Pandey | ............... | G06Q 20/322 |
| 2025/0190226 A1 * | 6/2025 | Zhu | ..................... | G06F 9/44505 |

OTHER PUBLICATIONS

Morrison, JP, "Data Responsive Modular Interleaved Task Programming System", Jan. 1, 1971, 4 pages.
Node-RED.org, "Node-RED", Downloaded from the Internet on Aug. 28, 2023, 16 pages.(https://nodered.org/).

* cited by examiner

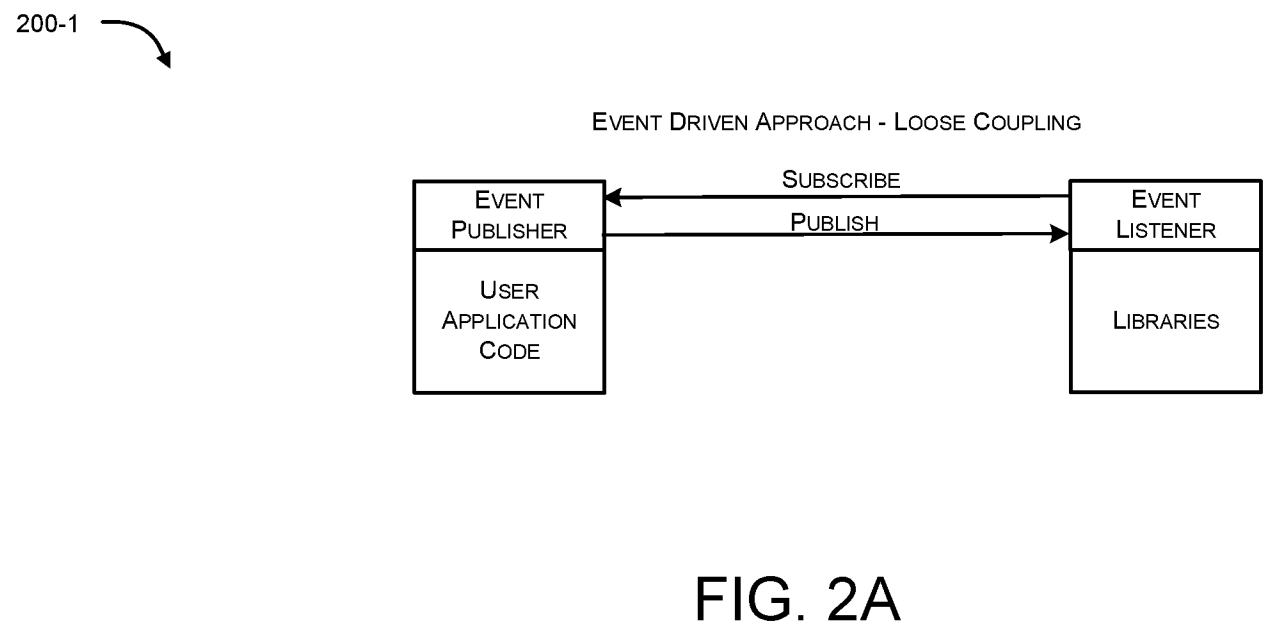

EVENT DRIVEN APPROACH - LOOSE COUPLING

SUBSCRIBE

PUBLISH

EVENT
LISTENER

LIBRARIES

EVENT
PUBLISHER

USER
APPLICATION
CODE 200-1

FIG. 2A

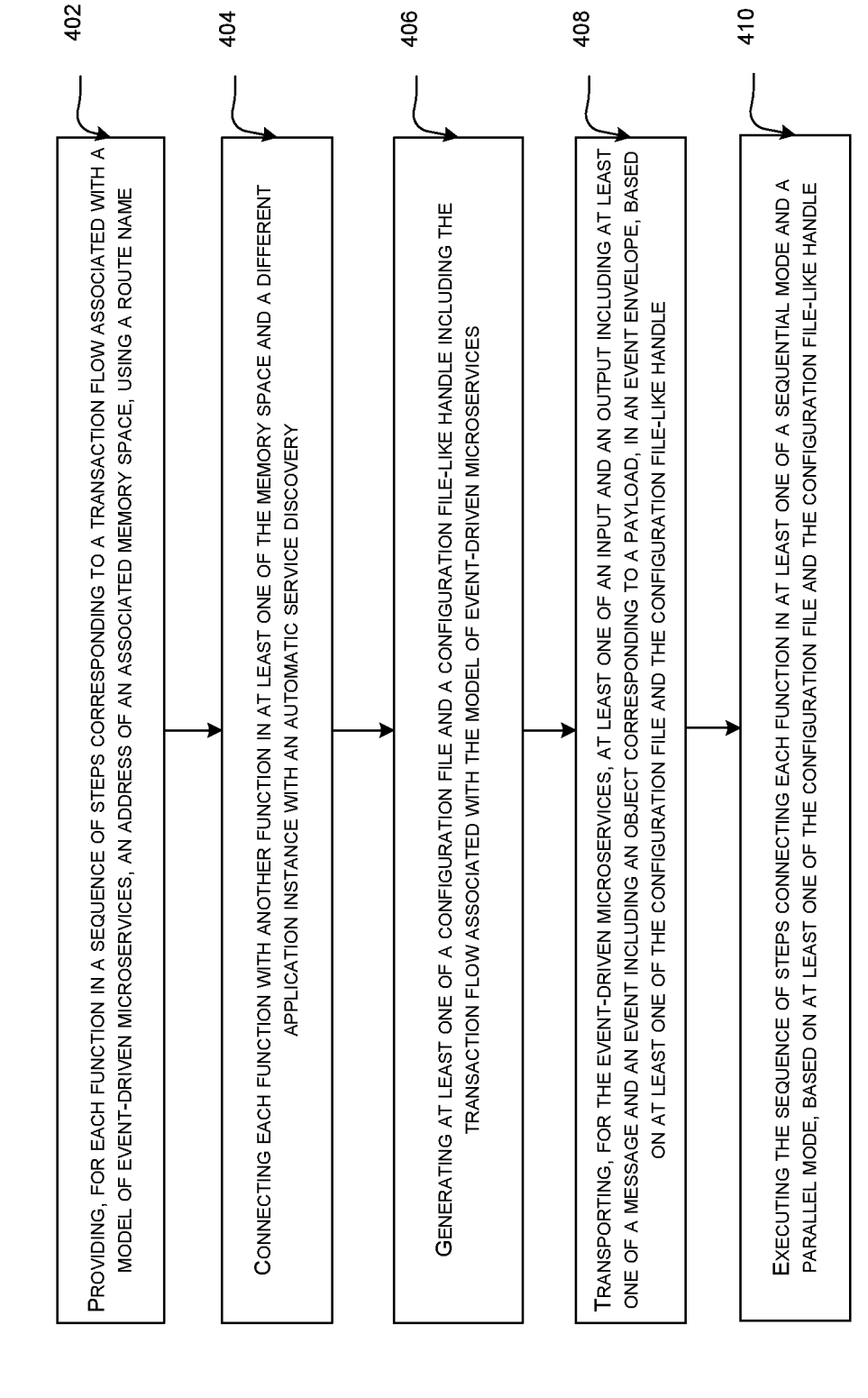

402 PROVIDING, FOR EACH FUNCTION IN A SEQUENCE OF STEPS CORRESPONDING TO A TRANSACTION FLOW ASSOCIATED WITH A MODEL OF EVENT-DRIVEN MICROSERVICES, AN ADDRESS OF AN ASSOCIATED MEMORY SPACE, USING A ROUTE NAME

404 CONNECTING EACH FUNCTION WITH ANOTHER FUNCTION IN AT LEAST ONE OF THE MEMORY SPACE AND A DIFFERENT APPLICATION INSTANCE WITH AN AUTOMATIC SERVICE DISCOVERY

406 GENERATING AT LEAST ONE OF A CONFIGURATION FILE AND A CONFIGURATION FILE-LIKE HANDLE INCLUDING THE TRANSACTION FLOW ASSOCIATED WITH THE MODEL OF EVENT-DRIVEN MICROSERVICES

408 TRANSPORTING, FOR THE EVENT-DRIVEN MICROSERVICES, AT LEAST ONE OF AN INPUT AND AN OUTPUT INCLUDING AT LEAST ONE OF A MESSAGE AND AN EVENT INCLUDING AN OBJECT CORRESPONDING TO A PAYLOAD, IN AN EVENT ENVELOPE, BASED ON AT LEAST ONE OF THE CONFIGURATION FILE AND THE CONFIGURATION FILE-LIKE HANDLE

410 EXECUTING THE SEQUENCE OF STEPS CONNECTING EACH FUNCTION IN AT LEAST ONE OF A SEQUENTIAL MODE AND A PARALLEL MODE, BASED ON AT LEAST ONE OF THE CONFIGURATION FILE AND THE CONFIGURATION FILE-LIKE HANDLE

FLOW CONFIGURABLE EVENT-DRIVEN MICROSERVICES

PRIORITY CLAIM

This application claims priority from U.S. provisional application No. 63/410,768, filed with the US Patent Office on Sep. 28, 2022, the disclosure of which is incorporated in its entirety herein.

BACKGROUND

Generally, mobile and computer applications may be complex and sophisticated as most of the applications are written in a tightly coupled manner. A user application code may call a method in one or more libraries, and the one or more libraries may return a result corresponding to the called method, which may be considered to be a tight coupling approach. In the tight coupling approach, the complexity of executing the code may increase as the code grows and may include bugs, side-effects, and other such limitations. The application code in one method may directly call another method to link the method together when the application is compiled into byte code or machine code. Conventional methods may include layered software and dependency management and object-oriented design. In the conventional programming approach, an application may grow to a monolithic scale. Current methods may improve the structure of the application using object-oriented design, functional and reactive programming, and dependency injection where "concrete" implementation of a business logic is injected at the application "built time" or even "run time."

Additionally, microservices architecture may describe an architectural pattern to deliver smaller pieces of self-contained "single responsibility" modules that are connected through a network. This may reduce the size of an application. However, using a conventional approach to write functions and connect the functions using direct method invocation in a single microservices module, may lead to the tight coupling of the functions. Further, a Flow-Based Programming (FBP) approach may allow individual functions (blocks of code) to be connected according to a "flow." The FBP executes a sequence of steps where one step invokes another step according to a plan. Further, in FBP, each step (block of code) is aware of the upstream and downstream data model. Additionally, the FBP may also allow separation of the business logic from connectivity between the business logic. The FBP may be suitable for a telecommunications technology and Internet of Things (IoT) technology. Further, the FBP may provide "low-code" where pre-defined user interaction (e.g., filling a form) and business logic are linked using a Graphical User Interface (GUI) to form a single application.

Conventionally, a connection in the FBP, for the data flow, may be implemented using a socket communication and a connectivity (or "wiring") may be constructed using the GUI. For example, consider an example application of a "hello world" code segment using the FBP approach. In this scenario, the FBP may be intended to provide a clear separation of data connectivity and business logic so that each block of code follows the first principle of data processing such as input/process/output. However, clean separation of the data model from each block of code for a complex transaction may not be an easy task. For example, the FBP may not decouple the transaction data model from business logic. As a result, one block of code (business logic) may be tightly coupled with another block of code, thus reducing flexibility and code reusability.

Conventional methods may not provide insights to the user regarding multiple levels of software and libraries. Additionally in the case of application modules that are tightly coupled together, and if foundation modules are not frozen, multiple levels of software may need patches during application development. Further, conventional methods may require a deep learning curve regarding code, context, and suffer from inadequate configuration management and test data with non-updated documentation.

Therefore, there may be a need for systems and methods for addressing at least the above-mentioned problems in the existing approaches by providing systems and methods for managing flow configurable event-driven microservices.

SUMMARY

In an aspect, the present disclosure relates to a system including a processor, and a memory coupled to the processor, where the memory may include processor-executable instructions, which on execution, cause the processor to provide, for each function in a sequence of steps corresponding to a transaction flow associated with a model of event-driven microservices, an address of an associated memory space, using a route name, connect each function with another function in at least one of the memory space and a different application instance with an automatic service discovery, generate at least one of a configuration file and a configuration file-like handle including the transaction flow associated with the model of event-driven microservices, transport, for the event-driven microservices, at least one of an input and an output including at least one of a message and an event including an object corresponding to a payload, in an event envelope, based on at least one of the configuration file and the configuration file-like handle, and execute the sequence of steps connecting each function in at least one of a sequential mode and a parallel mode, based on at least one of the configuration file and the configuration file-like handle.

In an example embodiment, each function may communicate with the other function in the event-driven microservices using at least one of an in-memory event bus and a network event bus.

In an example embodiment, the transaction flow may include a transaction corresponding to an instance of a flow execution defined in a configuration.

In an example embodiment, the configuration may provide the transaction flow and corresponding data mapping to provide for each function, associated input and associated output without knowledge of the rest of the transaction in the model.

In an example embodiment, the processor may configure a delay tag in the transaction flow to execute the transaction in a deferred manner, where the delay tag may include one of a fixed delay and a variable delay.

In an example embodiment, the flow may be generalized for at least one of a request-response Remote Procedure Call (RPC) and an asynchronous processing technique.

In an example embodiment, the event envelope may include at least one of headers for holding optional parameters, a body for holding the payload of the object, and essential metadata comprising at least one of a unique event identity (ID), a correlation ID, a status code, an exception, a trace ID, and a trace path.

In an example embodiment, the processor may execute the sequence of steps connecting each function in a pipeline mode, based on at least one of the configuration file and the configuration file-like handle.

In an example embodiment, the processor may configure an expiry timer as a maximum time for the transaction flow to finish the execution of the sequence of steps.

In another aspect, the present disclosure relates to a method including providing, by a processor associated with a system, for each function in a sequence of steps corresponding to a transaction flow associated with a model of event-driven microservices, an address of an associated memory space, using a route name, connecting, by the processor, each function with another function in at least one of the memory space and a different application instance with an automatic service discovery, generating, by the processor, at least one of a configuration file and a configuration file-like handle including the transaction flow associated with the model of event-driven microservices, transporting, by the processor, for the event-driven microservices, at least one of an input and an output including at least one of a message and an event including an object corresponding to a payload, in an event envelope, based on at least one of the configuration file and the configuration file-like handle, and executing, by the processor, the sequence of steps connecting each function in at least one of a sequential mode and a parallel mode, based on at least one of the configuration file and the configuration file-like handle.

In an example embodiment, each function may communicate with the other function in the event-driven microservices using at least one of an in-memory event bus and a network event bus.

In an example embodiment, the transaction flow may include a transaction corresponding to an instance of a flow execution defined in a configuration.

In an example embodiment, the configuration may provide the transaction flow and corresponding data mapping to provide for each function, associated input and associated output without knowledge of the rest of the transaction in the model.

In an example embodiment, the method may include configuring, by the processor, a delay tag in the transaction flow to execute the transaction in a deferred manner, where the delay tag may include one of a fixed delay and a variable delay.

In an example embodiment, the flow may be generalized for at least one of a request-response RPC and an asynchronous processing technique.

In an example embodiment, the event envelope may include at least one of headers for holding optional parameters, a body for holding the payload of the object, and essential metadata comprising at least one of a unique event ID, a correlation ID, a status code, an exception, a trace ID, and a trace path.

In an example embodiment, the method may include executing, by the processor, the sequence of steps connecting each function in a pipeline mode, based on at least one of the configuration file and the configuration file-like handle.

In an example embodiment, the method may include configuring, by the processor, an expiry timer as a maximum time for the transaction flow to finish executing the sequence of steps.

In another aspect, the present disclosure relates to a non-transitory computer-readable medium including machine-readable instructions that are executable by a processor to provide, for each function in a sequence of steps corresponding to a transaction flow associated with a model of event-driven microservices, an address of an associated memory space, using a route name, connect each function with another function in at least one of the memory space and a different application instance with an automatic service discovery, generate at least one of a configuration file and a configuration file-like handle including the transaction flow associated with the model of event-driven microservices, transport, for the event-driven microservices, at least one of an input and an output including at least one of a message and an event including an object corresponding to a payload, in an event envelope, based on at least one of the configuration file and the configuration file-like handle, and execute the sequence of steps connecting each function in at least one of a sequential mode and a parallel mode, based on at least one of the configuration file and the configuration file-like handle.

In an example embodiment, the transaction flow may include a transaction corresponding to an instance of a flow execution defined in a configuration, where the configuration may provide the transaction flow and corresponding data mapping to provide for each function, associated input and associated output without knowledge of the rest of the transaction in the model.

BRIEF DESCRIPTION OF DRAWINGS

FIG. 2A illustrates an exemplary flow diagram representation of an event-driven approach with loose coupling, according to an example embodiment of the present disclosure.

FIG. 4 illustrates an exemplary flow diagram representation of a method for managing flow-flow configurable event-driven microservices, according to an example embodiment of the present disclosure.

5                                                                          6

Figure 1:
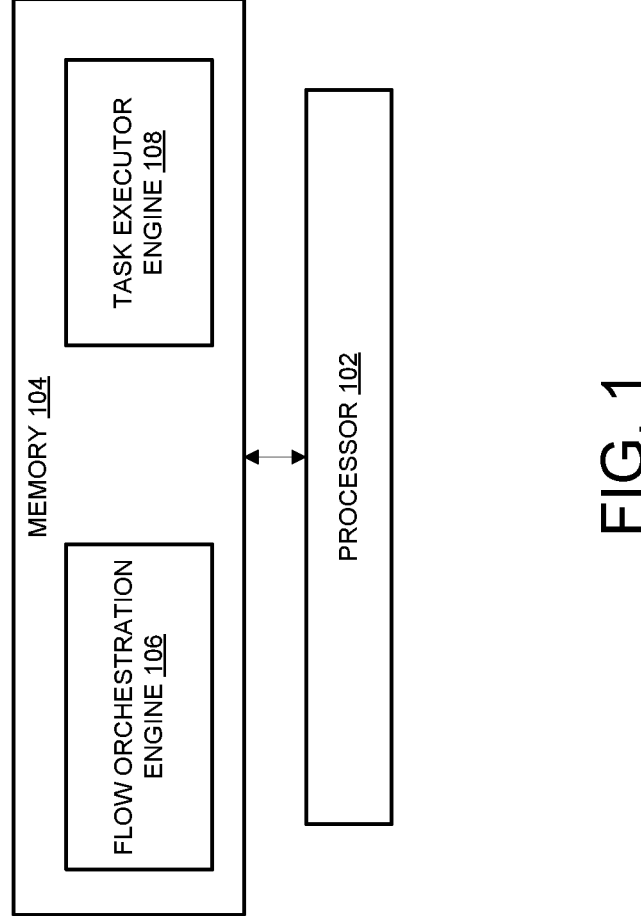
FIG. 1 illustrates an exemplary block diagram representation of a system for managing flow configurable event-driven microservices, according to an example embodiment of the present disclosure.

The foregoing shall be more apparent from the following more detailed description of the disclosure.

DETAILED DESCRIPTION

In the following description, for the purposes of explanation, various specific details are set forth in order to provide a thorough understanding of examples of the present disclosure. It will be apparent, however, that examples of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides examples only, and is not intended to limit the scope, applicability, or configuration of the disclosure. Rather, the ensuing description of the examples will provide those skilled in the art with an enabling description for implementing an exemplary example. It should be understood that various changes may be made in the function and arrangement of elements without departing from the spirit and scope of the examples as set forth.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one example" or "an example" or "an instance" or "one instance" means that a particular feature, structure, or characteristic described in connection with the example is included in at least one example of the present disclosure. Thus, the appearances of the phrases "in one example" or "in an example" in various places throughout this specification are not necessarily all referring to the same example. Furthermore, the particular features, structures, or characteristics may be combined in any suitable manner in one or more examples.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Various embodiments describe systems and methods for managing a flow configurable event-driven microservices. The present disclosure provides systems and methods for decoupling data model from individual functions when the functions are connected in two or more steps in a single transaction. Each function may include predefined input and output that are immutable and free from "side-effects." The present disclosure provides systems and methods for performing data mapping between a stateful data model in a transaction and the input/output of each individual function that is connected in two or more steps in a single transaction. Each function may be a set of self-contained business logic with a well-defined input/output interface contract with immutability. The present disclosure helps in statelessness with no side-effects to the underlying state of a transaction. A developer may focus on one function without knowledge of the rest of the system/application. The present disclosure allows ease of transaction test because the flow may be pre-defined and traceable. The present disclosure provides systems and methods for delivering events among functions within a standalone application using a memory bus or among applications using a network event bus. The present disclosure provides systems and methods for expressing a transaction flow as a Data Flow Diagram (DFD) and an application may be modeled using Domain Driven Design (DDD). Further, the present disclosure provides an application of inherently non-blocking and high performance with observability for continuous improvements. The present disclosure allows code re-usability due to the loose coupling approach. Further, the present disclosure provides systems and methods for updating a business use case documentation using the data flow, which in turn may be used for knowledge sharing.

Various embodiments of the present disclosure will be explained in conjunction with FIGS. 1-5.

FIG. 1 illustrates an exemplary block diagram representation of a system 100 for managing flow configurable event-driven microservices, according to an example embodiment of the present disclosure. The system 100 may be implemented by way of a single device or a combination of multiple devices that may be operatively connected or networked together. The system 100 may be implemented in hardware or a suitable combination of hardware and software. The system 100 may include a processor 102 and a memory 104. The memory 104 may include a flow orchestration engine 106 and a task executor engine 108.

In an example embodiment, the system 100 may be a hardware device including the processor 102 executing machine-readable program instructions to manage flow configurable event-driven microservices. Execution of the machine-readable program instructions by the processor 102 may enable the proposed system 100 to manage the flow of configurable event-driven microservices. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors 102. The processor 102 may include, for example, microprocessors, microcomputers, microcontrollers, digital signal processors, central processing units, state machines, logic circuits, and/or any devices that manipulate data or signals based on operational instructions. Among other capabilities, the processor 102 may fetch and execute computer-readable instructions in the memory 104 operationally coupled with system 100 for performing tasks such as data processing, input/output processing, and/or any other functions. Any reference to a task in the present disclosure may refer to an operation being or that may be performed on data.

In an example embodiment, the processor 102 may execute the flow orchestration engine 106 to provide, for each function in a sequence of steps corresponding to a transaction flow associated with a model of event-driven microservices, an address of an associated memory space, using a route name. In an example embodiment, the transaction flow may include a transaction corresponding to an instance of a flow execution defined in a configuration. In an example embodiment, the configuration may provide the transaction flow and corresponding data mapping to provide for each function, associated input and associated output without knowledge of the rest of the transaction in the model. In an example embodiment, the flow may be generalized for at least one of a request-response Remote Procedure Call (RPC) and an asynchronous processing technique. The flow orchestration engine 106 may listen to incoming requests and create a transaction flow instance, and command the task executor engine 108 to run a flow instance using one or more user functions (i.e., "tasks"). For example, a system application code may perform input data mapping and send an event to a user function for execution. When the function finishes execution, the task executor engine 108 may collect the result set and perform output data mapping to a temporary transaction data store ("model"). Based on the flow configuration, the task executor engine 108 may determine the next task for execution until an "end" task is executed.

In an example embodiment, the task may include one or more types of tasks such as, but not limited to, a decision task, a response task, an end task, a normal task, a sequential task, a parallel task, a fork task, a join task, a sink task, a wait task, and the like. The decision task may be a task that takes some input and decides what to do next. In the flow configuration, the decision task may include a "decision" value that is part of the result set. The decision task may also include a "next" task section that may contain a list of two or more tasks. The decision value may be Boolean (2 choices) or Number (from 1 to n).

Further, the response task may be for an interactive transaction, when a response task finishes execution, the result set may be mapped to the external output for delivery to the caller. Furthermore, when an end task finishes execution, the transaction flow may be said to be completed. If no response task has been executed before the end task, the result set from the end task may be mapped to the external output for delivery to the caller if it is an interactive transaction. Additionally, the normal task may be a processing step in a transaction flow. Its result set may be used to update the transaction state (data model). Further, in the sequential task, the normal task may be said to be "sequential" if the task executor engine 108 connects it to another task. Further, the normal task may be said to be a parallel task, if the task includes more than one "next" task. The task executor engine 108 may execute the next tasks in parallel.

Furthermore, a task may be said to be "fork-n-join" if the task includes more than one "next" task and a "join" task. The task executor engine 108 may execute the next tasks in parallel and then join all the result sets before passing them to the "join" task. The join task may be a task that may be executed after all tasks defined in a fork task are completed. Further, the sink task may be a normal task without any next tasks. A sink task may be used in conjunction with "parallel tasks" and "fork-n-join" tasks. For parallel task usage, some parallel tasks may be processed in a "drop-n-forget" manner so that the flow may go into a sink. If there are no alternative paths for the flow running, the flow may not be complete, and the task may be aborted after expiry (TTL). For the fork-n-join task usage, the parallel executed tasks may be joined into the next task (or "join" task) and thus, the individual tasks in the fork-n-join parallel task list may be the sink task. Additionally, the wait task may be a special decision task. Before its execution, the task executor engine 108 may save the transaction state (data model) in some persistent storage and suspend the wait task. The wait task may be "waked" up through an operator intervention, where the operator may provide additional inputs (e.g., approval signal) for the wait task to decide to select the next task.

In an example embodiment, the processor 102 may execute the flow orchestration engine 106 to connect each function with another function in at least one of the memory space and a different application instance with an automatic service discovery. In an example embodiment, the processor 102 may execute the flow orchestration engine 106 to generate at least one of a configuration file and a configuration file-like handle comprising the transaction flow associated with the model of event-driven microservices.

In an example embodiment, the processor 102 may execute the task executor engine 108 to transport, for the event-driven microservices, at least one of an input and output comprising at least one of a message and an event comprising an object corresponding to a payload, in an event envelope, based on the at least one of the configuration file and the configuration file-like handle. In an example embodiment, the event envelope may include, but not be limited to, headers for holding optional parameters, a body for holding a payload of the object, and essential metadata including at least one of a unique event identity (ID), a correlation ID, a status code, an exception, a trace ID, and a trace path. The metadata may include additional information for the flow orchestration engine 106 for routing and decision making, e.g., a unique correlation ID may be applied to all events in a single transaction flow. The correlation ID may be a unique identifier for a single transaction where the correlation ID may be used to correlate the events for all functions involved in a transaction flow.

In an example embodiment, each function may communicate with the other function in the event-driven microservices using at least one of an in-memory event bus and a network event bus. In an example embodiment, the processor 102 may execute the task executor engine 108 to execute the sequence of steps connecting each function in at least one of a sequential mode and a parallel mode, based on at least one of the configuration file and the configuration file-like handle.

Although FIG. 1 shows exemplary components of the system 100, in other examples, the system 100 may include fewer components, different components, differently arranged components, or additional functional components than depicted in FIG. 1. Additionally, or alternatively, one or more components of the system 100 may perform functions described as being performed by one or more other components of the system 100.

FIG. 2A illustrates an exemplary flow diagram representation 200-1 of an event-driven approach with loose coupling, according to an example embodiment of the present disclosure.

In the event-driven microservices, each function may be addressable using a "route name." An input and an output to/from the event-driven microservices may be transported, by the processor 102, using a standardized "event envelope." The event envelope may include, but not be limited to, headers for holding optional parameters, a body for holding a payload of a business object, essential metadata such as a unique event ID, a correlation Identity ID, a status code, an exception, a trace ID, a trace path, and the like. The disclosed event-driven microservices may use an event-driven approach with loose coupling. The application code in one method may call another method, using publish and subscribe method, to link the method together when the application may be compiled into byte code or machine code.

Figure 2B:
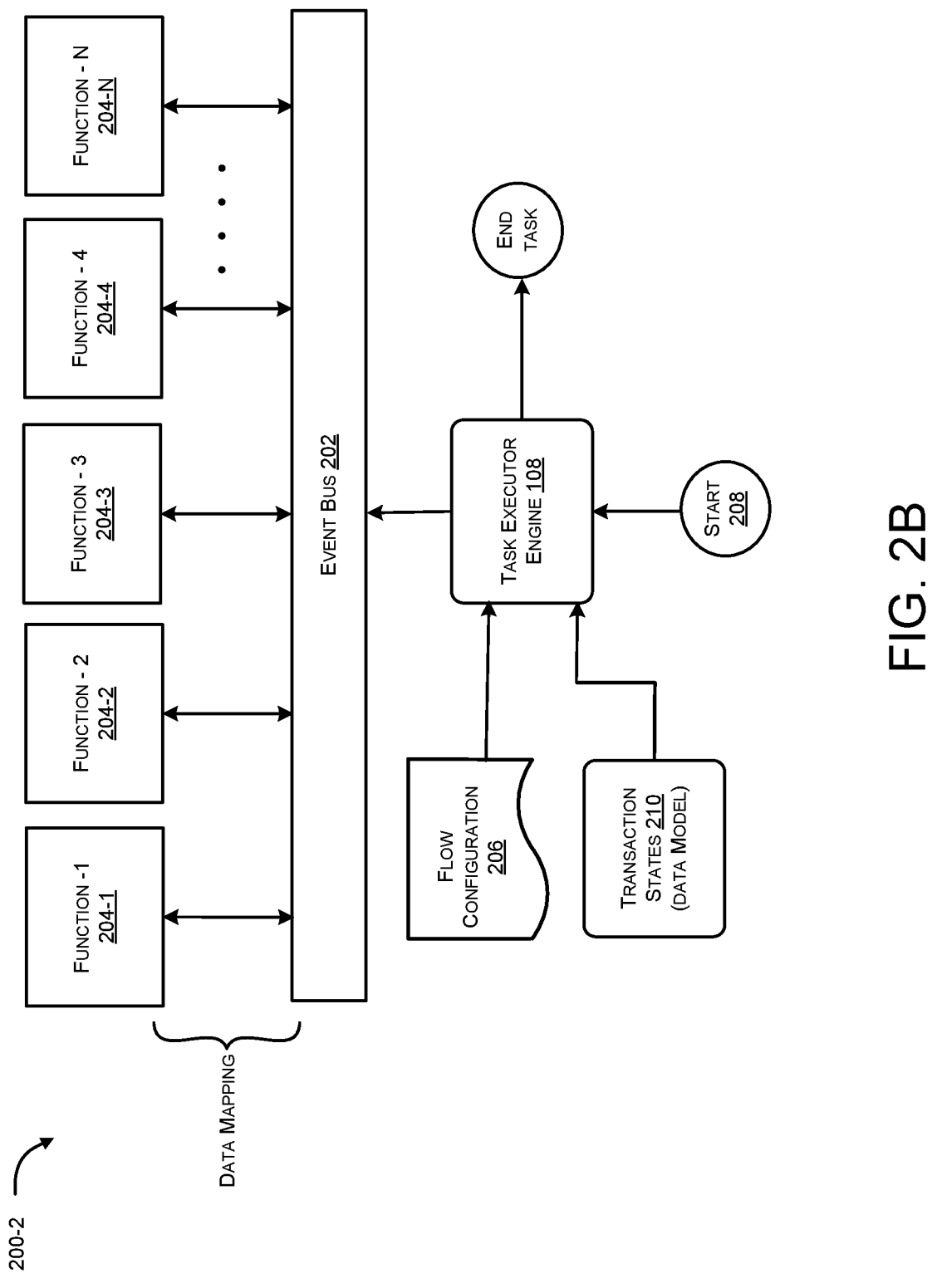
FIG. 2B illustrates an exemplary flow diagram representation of a method for managing flow configurable event-driven microservices, according to an example embodiment of the present disclosure.

FIG. 2B illustrates an exemplary flow diagram representation of a method 200-2 for managing flow configurable event-driven microservices, according to an example embodiment of the present disclosure.

In an example embodiment, each function may communicate with other function in the event-driven microservices using an in-memory and/or network event bus (hereinafter referred to as event bus 202). The event-driven microservices functions may be connected by the in-memory event bus (i.e., event bus 202). Some programming languages such as, but not limited to, Node.Js®, C #, Python®, and the like, may have built-in event loops which may be used as the in-memory event bus 202. Other languages may require a separate in-memory event system library.

In an example embodiment, the function-1 204-1, function-2 204-2, function-3 204-3, function-4 204-4, . . . , function-N 204-N (individually referred to as the function 204 and collectively referred to as the functions 204) may reside in a same memory space in a container, where a function 204 in one container may connect to another function in a different container using the network event bus 202. For example, in pseudo-code, a function may be registered as shown below:

"v1.demo.function"=f(x): result

Where, the variable "x" may be an input (i.e., incoming event) and the result may be an output.

To send an event to a function 204, a calling function may execute pseudo code as shown below:

EventEmitter.send("v1.demo.function", somePayload)

In a flow transaction, the functions 204 may not voluntarily send events. Each function 204 may run in a simple input/process/output scheme without knowledge of the rest of the application. The wiring of the functions 204 and the transmission/receipt of events may be fully encapsulated by the flow orchestration engine 106 that may be driven by a configuration.

In an example embodiment, a flow configuration 206 may include a flow of transactions. Each flow may include a "time-to-live (TTL)" value. For example,

```
flow:
    id: 'hello-world'
    description: 'Demonstrate task execution, decision, and exit'
    ttl: 10s
```

If the transaction may not finish within the TTL value, the transaction may expire, and a caller of the transaction may be notified. The TTL may correspond to an expiry timer, also known as "time to live," which may define the maximum time for a flow to finish execution. If a flow may not finish within the TTL value, the flow orchestration engine 106 may abort the flow. For interactive transactions, the flow orchestration engine 106 may return a "time out" exception to the caller. In an example embodiment, in a start task 208, each flow may include a starting point.

```
first:
    task: 'v1.validate.request'
```

In the above example, "v1.validate.request" may be the route name for the starting function.

In an example embodiment, the task executor engine 108 may perform input data mapping, which may map external input and transaction data states 210 to the input arguments of the task. Each function 204 (business logic) may be defined in the most basic form of input/process/output. The business logic in each function 204 may manage regarding respective own input and generate output according to an interface contract defined for the function 204. The task executor engine 108 may perform data mapping between the transaction data models including transaction data states 210 and the input/output of each function.

In an example embodiment, the system 100 may simulate an artificial delay in a configuration. For this, the system 100 may add a "delay" tag in a task to execute the task in a deferred manner. As an example, this feature of artificial delay may be used for unit tests or other special cases. Because the system 100 is event-driven and non-blocking, the delay may be simulated by event scheduling, so that it does not block the current thread or the flow. In an example embodiment, the system 100 may simulate fixed delay or variable delay as shown in below Table 1.

TABLE 1

| Type | Value | Example |
|---|---|---|
| Fixed delay | Milliseconds | delay: 1000 |
| Variable delay | State machine variable | delay: 'model.delay' |

The delay command may be ignored when delay may not be set to a state variable, i.e., its value may not be set by a prior data mapping. An example configuration for configuring the delay is shown below:

```
tasks:
    - input:
```

-continued

```
      - 'input.path_parameter.user -> user'
      - 'input.query.ex -> exception'
      - 'text(hello world) -> greeting'
    process: 'greeting.test'
    output:
      - 'text(application/json) -> output.header.content-type'
      - 'result -> output.body'
    description: 'Hello World'
    execution: end
    delay: 2000
```

Figure 3A:
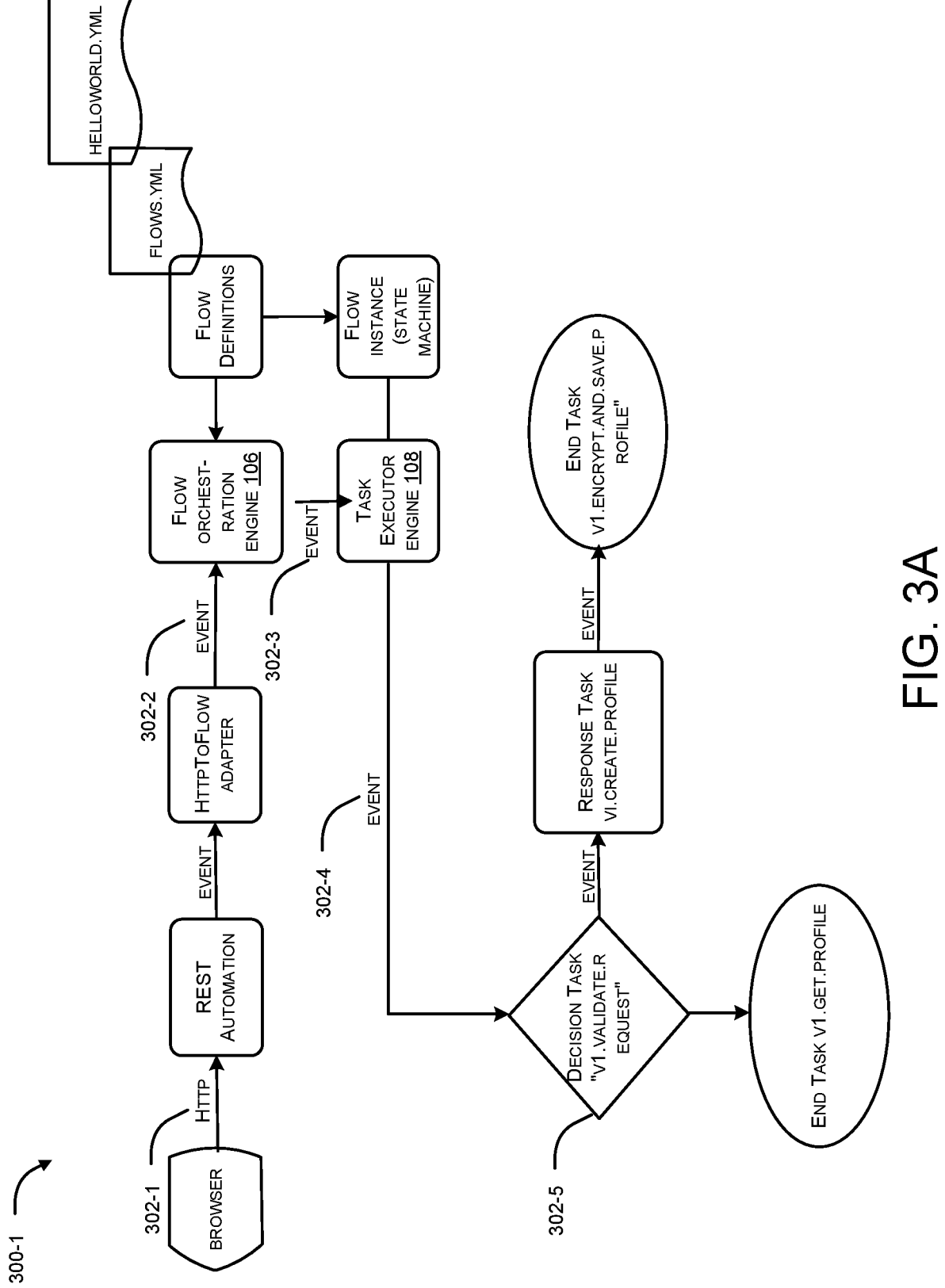
FIG. 3A illustrates an exemplary flow diagram representation of a method for a flow application, according to an example embodiment of the present disclosure.

FIG. 3A illustrates an exemplary flow diagram representation of a method 300-1 for a flow application, according to an example embodiment of the present disclosure.

Consider a first scenario of data flow for "GET/API/ profile/{profile_id}." At step 302-1, a hypertext transfer protocol (HTTP) request may be received by a representational state transfer (REST) automation, from a browser. At step 302-2, an "HttpToFlow" adapter may convert the HTTP request to a standardized event. At step 302-3, the flow orchestration engine 106 may create a new "flow instance" holding input dataset and a temporary transaction data model and assign the flow instance to the task executor engine 108. At step 302-4, the task executor engine 108 may run the first task in the flow. Each flow instance may include a unique correlation ID. Each task may be a function addressable by a route name. As an example, the first task is "v1.validate.request" which may be a "decision task." At step 302-5, the task executor engine 108 may execute the decision task to check if the incoming request may be acceptable. If not, the decision task may throw an exception that may be sent as an event to the task executor engine 108. In turn, the task executor engine 108 may send a response event to the HTTP adapter. The "v1.validate.request" may decide to route the request to "v1.get.profile." The "v1.get.profile" may be an "end task" where a result set of the "v1.get.profile" may be mapped into a final output for routing as a response to a user.

Figure 3B:
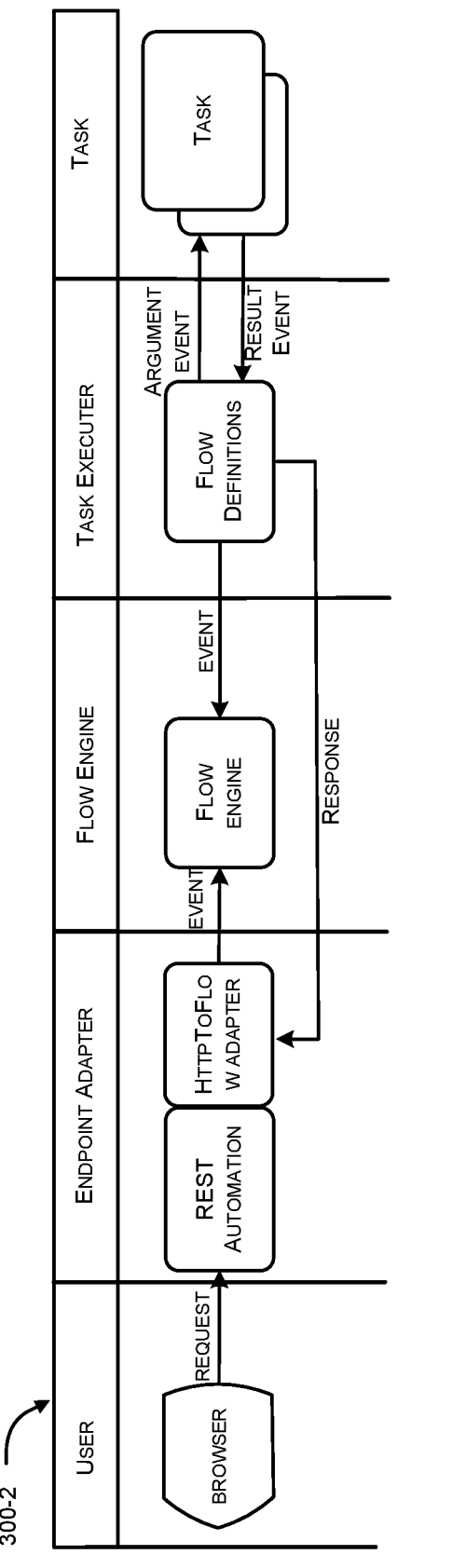
FIG. 3B illustrates an exemplary sequence diagram representation of a flow configurable event-driven microservices, according to an example embodiment of the present disclosure.

FIG. 3B illustrates an exemplary sequence diagram representation 300-2 of a flow configurable event-driven microservices, according to an example embodiment of the present disclosure. FIG. 3B may be explained in conjunction with FIG. 3A.

Consider a second scenario of a data flow for "POST/ API/profile." At step 302-1, an HTTP request may be received by a REST automation, from a browser. At step 302-2, an "HttpToFlow" adapter may convert the HTTP request to a standardized event. At step 302-3, the flow orchestration engine 106 may create a new "flow instance" holding input dataset and a temporary transaction data model and assign the flow instance to the task executor engine 108. At step 302-4, the task executor engine 108 may run the first task in the flow. Each flow instance may include a unique correlation ID. Each task may be a function addressable by a route name. As an example, the first task is "v1.validate.request" which may be a "decision task." At step 302-5, the task executor engine 108 may execute the decision task to check if the incoming request may be acceptable. If not, the decision task may throw an exception that may be sent as an event to the task executor engine 108. In turn, the task executor engine 108 may send a response event to the HTTP adapter. The "v1.validate.request" may decide to route the request to "v1.create.profile." The "v1.create.profile" may be a "response task" where its result set may be mapped into a final output for routing as a response to the user. At the same time, the next task may be "v1.encrypt.and.save.profile" which may take the mapped user input, perform field encryption, and save the encrypted content to a persistent storage.

Figure 3C:
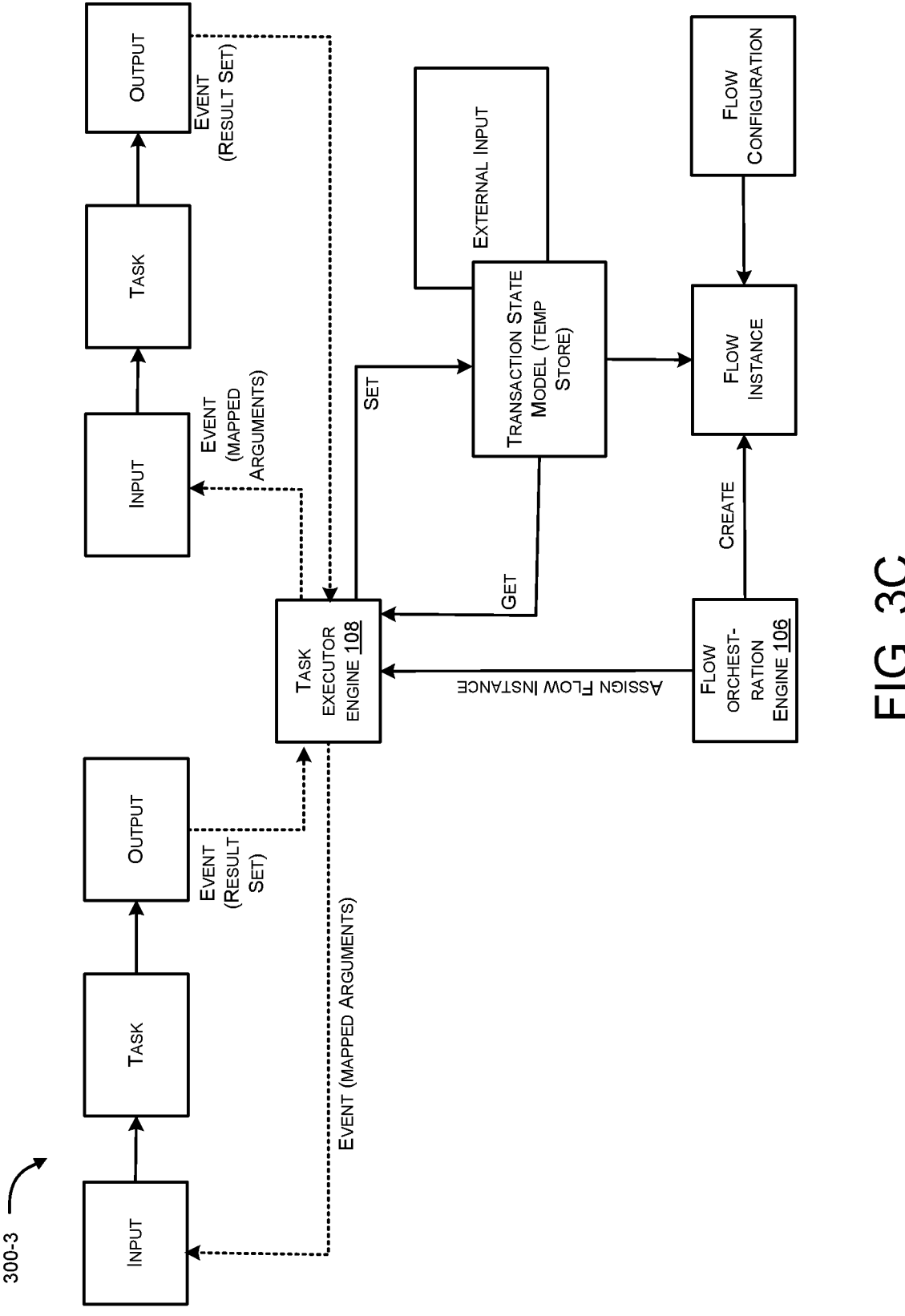
FIG. 3C illustrates an exemplary flow diagram representation of a data mapping method, according to an example embodiment of the present disclosure.

FIG. 3C illustrates an exemplary flow diagram representation of a data mapping method 300-3, according to an example embodiment of the present disclosure.

In an example embodiment, a logical representation of a transaction flow may be a holder for the flow template that describes the event flow among user functions. Each flow instance may be uniquely identified using a correlation ID and an expiry timer (TTL). This implies that the flow orchestration engine 106 may listen to incoming requests and create a transaction flow instance and command the task executor engine 108 to run the flow instance using one or more user functions (i.e., "tasks"). The task executor engine 108 may be a system application code that performs input data mapping and sends an event to a user function for execution. When the function finishes execution, the task executor engine 108 may collect the result set and perform output data mapping to a temporary transaction data store ("model"). Based on the flow configuration, the task executor engine 108 may find the next task for execution until an "end" task is executed.

As illustrated in FIG. 3C, the input dataset may be the original dataset from the user. The "argument" dataset may be the input to a task. Further, the event "result" dataset may be the output from a task. The "output" dataset may be the response to be sent to a caller. A flow instance may be a logical transaction that describes event communication from an entry point to an exit point. The event may be a unit of communication that holds data and metadata. The flow instance may be created by the flow orchestration engine 106, when a transaction arrives at the flow orchestration engine 106 and the transaction is designated to use a certain flow. Further, the flow instance may hold a template of the flow containing the pre-defined event flow of the use case, a correlation ID of the instance, and an optional "reply to" address. For an interactive transaction, the "reply to" address may be the return path of the caller, where the caller may be a program (graphical user interface or command line) or another event system/bus. For asynchronous transactions, there may be no "reply to" address, and the flow orchestration engine 106 may not need to respond to the caller at the end of the flow.

In an example, the data mapping for each task may need to be configured with input, data model, and output, as shown below:

```
    tasks:
      input:
        - 'model.profile_id -> profile_id'
        - 'text(address, telephone) -> protected_fields'
      process: 'v1.get.profile'
      output:
        - 'text(application/json) -> output.header.content-type'
        - 'result -> output.body'
      description: 'Retrieve user profile and decrypt fields if needed'
      execution: end
```

In the above configuration example, the function "v1.get.profile" may include input parameters of profile_id and protected_fields. The function may return a result set as "result" which may be mapped back to the "output." When "execution=end," this may indicate that this is the last task of the flow. If the task includes a subsequent task, the execution tag may be "response," "sequential," "pipeline," or "parallel." If "execution=response," the output from this task may be sent to the caller and the next task may be executed. If "execution=sequential," the output section may map the result set to the transaction state model so that the model may be mapped to the next task. If "execution=pipeline," a list of tasks may be executed orderly till completion of all pipeline tasks. When the pipeline tasks are completed, the system 100 may execute the "next" task. If "execution=parallel," more than one task in the "next" section may be executed in parallel.

An example pipeline task configuration may be as shown below:

```
tasks:
   - input:
         - 'input.path_parameter.user -> user'
         - 'input.query.seq -> sequence'
      process: 'sequential.one'
      output:
         - 'result -> model.pojo'
      description: 'Pass a pojo to another task'
      execution: pipeline
      pipeline:
         - 'echo.one'
         - 'echo.two'
      next:
         - 'echo.three'
```

In an example embodiment, pipeline task configuration may include for/while loops and if-then-else. An example for loop configuration may be shown as below:

```
tasks:
   - input:
         - 'input.path_parameter.user -> user'
         - 'input.query.seq -> sequence'
      process: 'sequential.one'
      output:
         - 'result -> model.pojo'
      description: 'Pass a pojo to another task'
      execution: pipeline
      loop:
         statement: 'for (model.n = 0; model.n < 3; model.n++)'
      pipeline:
         - 'echo.one'
         - 'echo.two'
         - 'echo.three'
      next:
         - 'echo.four'
```

In the above configuration example, the pipeline may be executed three times before passing control to the "next" task.

In an example embodiment, the loop statement may use a "while-loop" as shown below:

```
loop:
   statement: 'while (model.running)'
```

To exit the above while-loop, one of the functions in the pipeline may return a Boolean "false" value and the output data mapping may map it to the "model.running" variable.

In an example embodiment, the system 100 may evaluate if a "model.quit" variable exists in the configuration. If the variable exists, a "break" or "continue" condition may be executed, as shown below:

```
tasks:
   - input:
         - 'input.path_parameter.user -> user'
         - 'input.query.seq -> sequence'
      process: 'sequential.one'
      output:
         - 'result -> model.pojo'
      description: 'Pass a pojo to another task'
      execution: pipeline
      loop:
         statement: 'for (model.n = 0; model.n < 3; model.n++)'
         condition:
            mode: sequential
            statements:
               - 'if (model.quit) break'
      pipeline:
         - 'echo.one'
         - 'echo.two'
         - 'echo.three'
      next:
         - 'echo.four'
```

In the above configuration example, the state variable may be obtained after output data mapping and any task in the pipeline may set a key-value for mapping into the state variable.

In an example embodiment, the condition statement may use an "if-then-else" statement. Instead of break or continue condition, the statement may evaluate if another task may be executed. The "condition.mode" may be sequential or parallel. When it is set to sequential, the selected task may be executed, and the pipeline may resume. In another example embodiment, when it is set to parallel, the pipeline may resume immediately without waiting for the selected task to finish. The selected task may therefore run in parallel by itself. This may allow a pipeline to spin up another parallel task for some asynchronous processing, e.g., sending a notification message to the user in the middle of a transaction. The condition may be set dynamically by any task in the pipeline list. An example configuration for parallel condition is shown below:

```
tasks:
   - input:
         - 'input.path_parameter.user -> user'
         - 'input.query.seq -> sequence'
      process: 'sequential.one'
      output:
         - 'result -> model.pojo'
      description: 'Pass a pojo to another task'
      execution: pipeline
      loop:
         statement: 'for (model.n = 0; model.n < 4; model.n++)'
         condition:
            mode: parallel
            statements:
               - 'if (model.jump) echo.ext1 else echo.ext2'
      pipeline:
         - 'echo.one'
         - 'echo.two'
         - 'echo.three'
      next:
         - 'echo.four'
```

In an example embodiment, the decision task may be as shown below:

```
tasks:
   - input:
      - 'input.method -> method'
      - 'input.header.content-type -> content-type'
```

-continued

```
- 'input.path_parameter.profile_id -> profile_id'
- 'input.body -> body'
- 'text(id, name, address, telephone) -> required_fields'
process: 'v1.validate.request'
output:
- 'result.profile_id -> model.profile_id'
description: 'Validate incoming request and determine next steps'
execution: decision
decision: 'result.decision'
next:
- 'v1.get.profile'
- 'v1.create.profile'
```

In the above configuration example, the decision task may be indicated by the "execution=decision" tag. In this example, the input arguments to this task may be a method, content-type, profile_id, body, and required_fields. This task "v1.validate.request" may check if the incoming request is valid and determine the next task to execute. There may be two next steps, v1.get.profile and v1.create.profile. If the method is "GET," this task may route the request to the "v1.get.profile" task. If the method is "POST," this task may route the request to the "v1.create.profile" task.

In an example, there may be an operator intervention, when "execution=wait," the system 100 may persist the transaction state model, suspend the flow, and wait for operator intervention. For example, this may allow the application to retrieve the suspended flows and populate them in an "inbox" so that the user may provide approval and additional inputs.

Figure 3D:
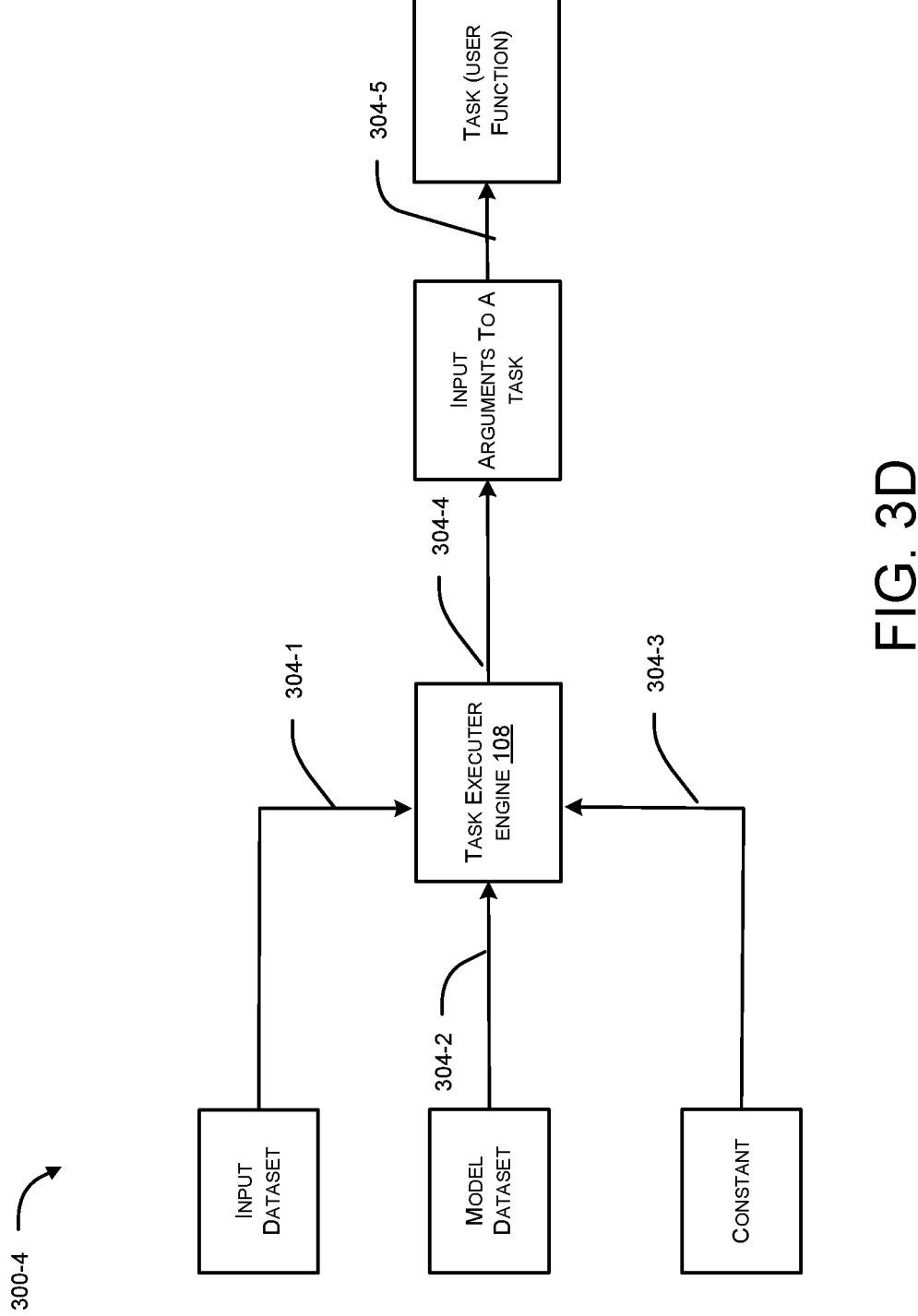
FIG. 3D illustrates an exemplary flow representation of a method for data mapping to function arguments, according to an example embodiment of the present disclosure.

FIG. 3D illustrates an exemplary flow representation of a method 300-4 for data mapping to function arguments, according to an example embodiment of the present disclosure.

At steps 304-1, 304-2, and 304-3, the task executor engine 108 may receive the input dataset, model dataset, and constant dataset, respectively. The constant dataset may include a constant value which may be a predefined data content in the flow configuration or an environment variable. For example, text (e.g., hello world) may imply a string of "hello world." Further, text (${HOSTNAME}) may imply a string retrieved from the environment variable "HOST-NAME".

At step 304-4, the task executor engine 108 may convert input arguments to a task. At step 304-5, the task executor engine 108 may execute a task which is a user function. The "task" may be a user function addressable by a "route name" and connected by the event bus (e.g., event bus 202). The task executor engine 108 may command a task to execute by sending the required "input arguments" to the "route" of the task. For example, the "v1.validate.request" may be the route name of a task that is responsible to validate the incoming request. The task executor engine 108 may use the event bus 202 to send an event to the task with the input arguments created through the "input data mapping" process.

Figure 3E:
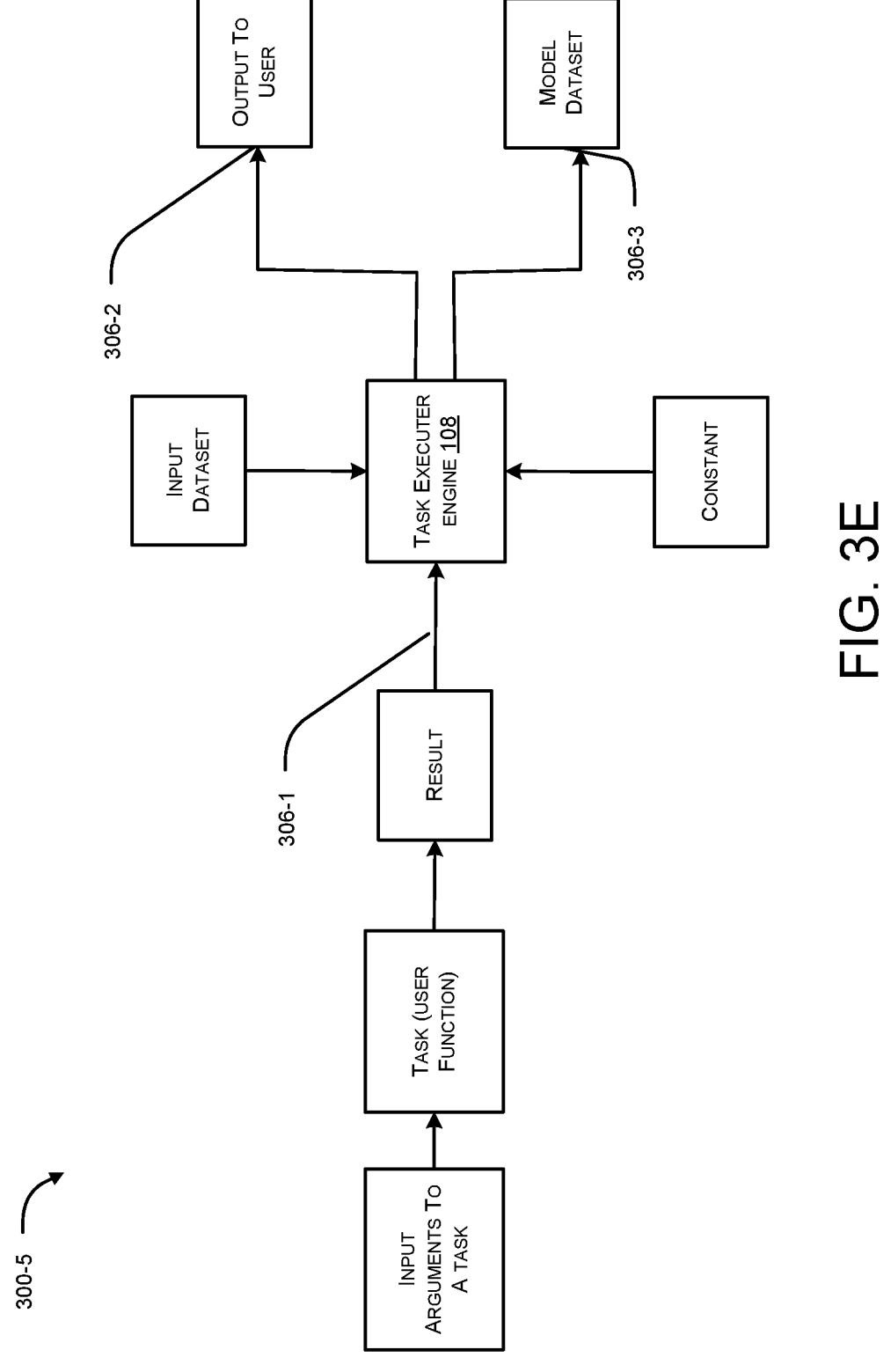
FIG. 3E illustrates an exemplary flow representation of a method for data mapping from function outputs, according to an example embodiment of the present disclosure.

FIG. 3E illustrates an exemplary flow representation of a method 300-5 for data mapping from function outputs, according to an example embodiment of the present disclosure.

At step 306-1, when the task exits, the result set may be sent to the task executor engine 108 for output data mapping. At steps 306-2 and 306-3, the task executor engine 108 may map the result set to an external output to the user and/or to transaction data states (i.e., model dataset).

Figure 3F:
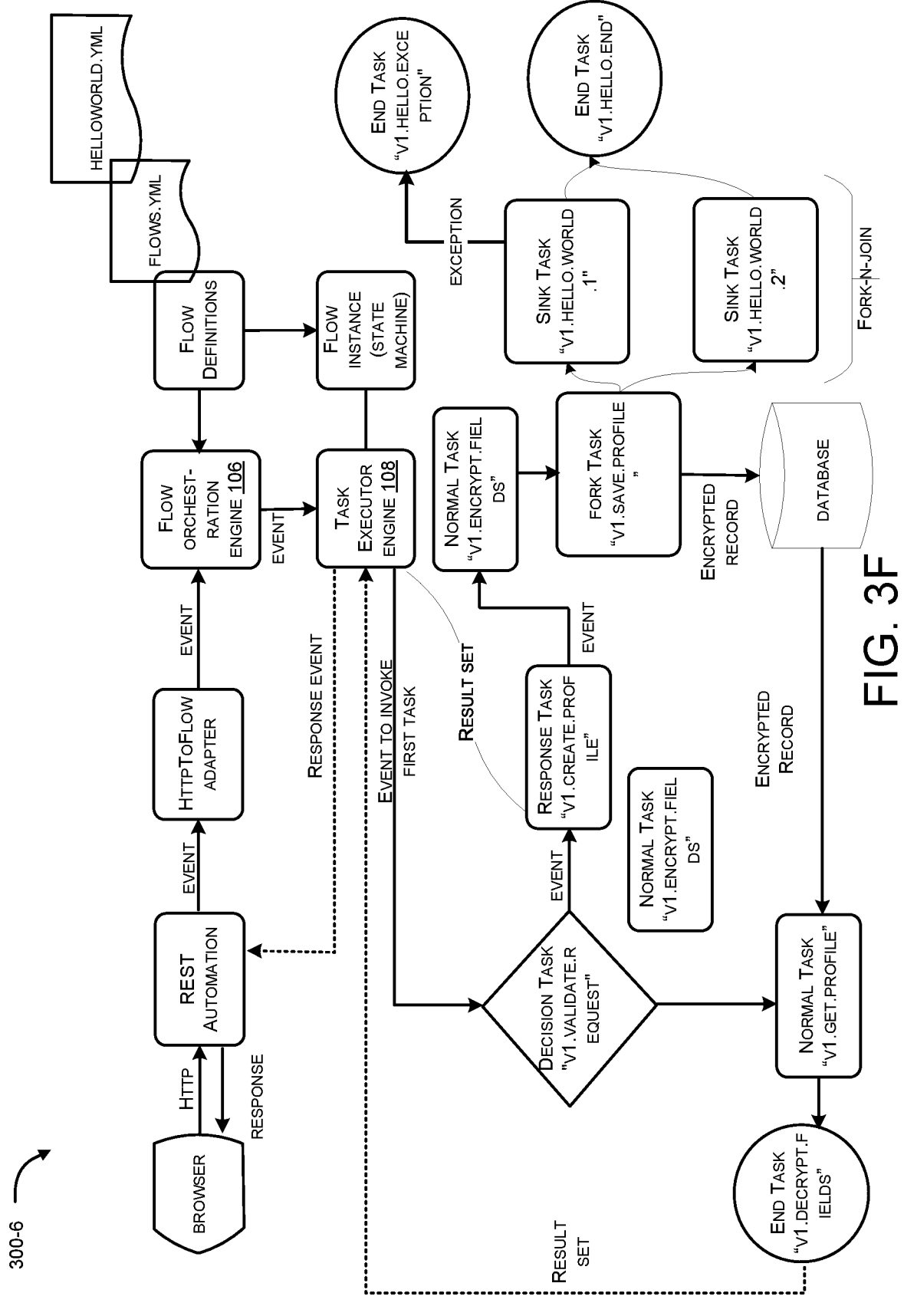
FIG. 3F illustrates an exemplary flow diagram representation of exemplary use case scenario, according to an example embodiment of the present disclosure.

FIG. 3F illustrates an exemplary flow diagram representation 300-6 of exemplary use case scenario, according to an example embodiment of the present disclosure.

Referring to FIG. 3F, the representation 300-6 may include a use case to upload and retrieve a user profile. Because the system 100 is designed to be event-driven, an adapter may be required to convert HTTP requests/responses to events. The "HttpToFlow" adapter may be a small piece of custom code to select a "hello world" flow for the demo. There may be two REST endpoints for the example use case as shown in Table 2:

TABLE 2

| Endpoint | Purpose |
| --- | --- |
| GET/api/profile/{profile_id} | Retrieve a user profile from persistent storage, decrypt some protected fields, and return the content to the user |
| POST/API/profile | Accept a user profile from the user, encrypt some protected fields, and save to persistent storage. |

Consider a use case scenario of retrieving a user profile. A user application may execute a REST call (GET/API/profile/{profile_id}) to a REST automation system that may route the request to the HttpToFlow adapter using the route name "HTTP.flow.adapter." The REST automation and the HttpToFlow adapter may be connected by the event bus 202. The REST automation system may insert a correlation ID and a custom header "X-Flow-Id: hello-world" and add a "reply to" address to the event. The flow orchestration engine 106 may map the "reply to" address together with the correlation ID to an HTTP context that the REST automation may correlate to the HTTP context for returning a response later, as shown below:

HTTP request→event→"http.flow.adapter"

The HttpToFlow adapter may extract the flow ID from the header "X-Flow-Id" and convert the HTTP request event into a standardized event to the flow orchestration engine 106 using the route name "flow.engine," as shown below:

"http.flow.adapter"→event→"flow.engine"

The flow orchestration engine 106 may receive the incoming event which may include a flow ID, a correlation ID, and the "reply to" address for the caller. Further, the flow orchestration engine 106 may load a flow configuration file according to the flow ID. Further, the flow orchestration engine 106 may create a new "flow instance" with a temporary transaction state (data model). Furthermore, the flow orchestration engine 106 may determine a first task in the flow configuration and command the task executor engine 108 to start. The task executor engine 108 may map input data from external input from the caller and optionally some constant values and the data model to input arguments suitable for the first task.

Furthermore, the task executor engine 108 may send the arguments in a standard event envelope to the first task. The first task may be executed. The first task may accept the input arguments from the event and perform some data processing to generate a result set that may be returned to the task executor engine 108 through the event bus 202. The task executor engine 108 may follow the flow configuration in the flow instance to check the type of the current task. As illustrated in FIG. 3F, the task executor engine 108 may determine the first task "v1.validate.request," perform input data mapping, and send the event to the task as shown below:

"task.executor"→event containing arguments→"v1.validate.request" The "v1.validate.request" task may perform validation and decide to select the next task as shown below:

"v1.validate.request"→event containing result set→"task.executor" When the user function exits, the result set may be sent by the event bus 202 to the task executor engine 108.

The task executor engine 108 may resolve the next task to be "v1.get.profile," i.e., normal task, from the result set, perform input data mapping, and send the event to the task, as shown below:

"task.executor"→event containing arguments→"v1.get.profile"

"v1.get.profile"→event containing result set→"task.executor"

The "v1.get.profile" task may check if the required profile is available in persistent storage. If not, the request may be rejected with status-404 ("Not Found"). If the required profile exists, data may be retrieved, and field decryption of some protected fields may be performed. When the user function exits, the result set may be sent by the event bus 202 to the task executor engine 108, as shown below:

"task.executor"→event containing result set→"async.http.response" The task executor engine 108 may determine that the result set is an "end" task. Further, the task executor engine 108 may map output data and send the event to the REST automation's HTTP response function called as the "async.http.response."

---

```
Example output:
{
    "address": "100 World Blvd",
    "name": "Hello World",
    "telephone": "123-456-789",
        "id": 12345
}
```

---

Consider an example scenario of storing the user profile. The user application may execute a REST call (POST/API/ profile) to the REST automation system that may route the request to the HttpToFlow adapter using the route name "http.flow.adapter." The REST automation and the HttpToFlow adapter may be connected by the event bus 202. The REST automation system may insert a correlation ID and a custom header "X-Flow-Id: hello-world" and add a "reply to" address to the event. The REST automation system may map the "reply to" address together with the correlation ID to an HTTP context that the REST automation may correlate to the HTTP context for returning a response later, as shown below:

HTTP request→event→"http.flow.adapter"

The HttpToFlow adapter may extract the flow ID from the header "X-Flow-Id" and convert the HTTP request event into a standardized event to the flow orchestration engine 106 using the route name "flow. Engine," as shown below:

"http.flow.adapter"→event→"flow.engine"

The flow orchestration engine 106 may receive the incoming event that may include the flow ID, the correlation ID, and the "reply to" address for the caller. Further, the flow orchestration engine 106 may load the flow configuration file according to the flow ID and create a new "flow instance" with a temporary transaction state (data model). Furthermore, the flow orchestration engine 106 may determine the first task in the flow configuration and command the task executor engine 108 to start. The task executor engine 108 may map input data from external input from the caller and optionally some constant values and the data model to input arguments suitable for the first task. Further, the task executor engine 108 may then send the arguments in a standard event envelope to the first task. The first task may execute the arguments in the event envelope. The first task may accept the input arguments from the event and perform some data processing to generate a result set that may be returned to the task executor engine 108 through the event bus 202. The task executor engine 108 may follow the flow configuration in the flow instance to check the type of the current task.

Further, the task executor engine 108 may determine the first task "v1.validate.request," perform input data mapping, and send the event to the task, as shown below:

"task.executor"→event containing arguments→"v1.validate.request"

The "v1.validate.request" may perform validation and decide to select the next task, as shown below:

"v1.validate.request"→event containing result set→"task.executor"

When the user function exits, the result set may be sent by the event bus 202 to the task executor engine 108. In an example embodiment, the task executor engine 108 may resolve the next task to be normal task such as "v1.get.profile." As explained herein, the normal task may be a processing step in a transaction flow. Its result set may be used to update the transaction state (data model). Further, in the sequential task, the normal task may be said to be "sequential" if the task executor engine 108 connects it to another task. Further, the normal task may be said to be a parallel task, if the task includes more than one "next" task. The task executor engine 108 may execute the next tasks in parallel.

In another example embodiment, the task executor engine 108 may resolve the next task to be "v1.create.profile" from the result set, perform input data mapping, and send the event to the task, as shown below:

"task.executor"→event containing arguments→"v1.create.profile"

"v1.create.profile"→event containing result set→"task.executor"

When the user function exits, the result set may be sent by the event bus 202 to the task executor engine 108, as shown below:

"task.executor"→event containing result set→"async.http.response"

Further, the task executor engine 108 may determine that this is a "response" task. Furthermore, the task executor engine 108 may map output data and send the event to the REST automation's HTTP response function called "async.http.response." Because the HTTP response function is not an "end" task, the task executor engine 108 may determine the next task to be a normal task, i.e. "v1.encrypt.fields," followed by a fork task, i.e. "v1.encrypt.and.save.profile" from the result set, perform input data mapping, and send the event to the task, as shown below:

"task.executor"→event containing arguments→"v1.encrypt.and.save.profile"

"v1.encrypt.and.save.profile"→event with result set→"task.executor"

The "v1.encrypt.and.save.profile" task may check the protected field list from the input argument and encrypt the profile fields using a master key from the keystore accordingly. The "v1.encrypt.and.save.profile" task may save the encrypted record to persistent storage (i.e., database) indexed by profile ID.

Consider an exemplary scenario of a "fork-n-join" as shown in FIG. 3F. To demonstrate the "fork-n-join," the task executor engine 108 may set the "v1.encrypt.and.save.profile" function to be a "fork" task. The fork task may include two "next" tasks ("v1.hello.world.1" and "v1.hello.world.2"). When the user function exits, the "v1.hello.world.1" and "v1.hello.world.2" may be executed by the task executor engine 108 in parallel. When both of the tasks have been completed, the task executor engine 108 may find the "join" task defined in the task definition of the "v1.encrypt.and.save.profile" task. In the above example, the "join" task may point to the "v1.hello.end" which may be an "end" task, as shown below:

"task.executor"→event containing arguments→"v1.hello.world.1"

"task.executor"→event containing arguments→"v1.hello.world.2"

"v1.hello.world.1"→event with result set→"task.executor"

"v1.hello.world.2"→event with result set→"task.executor"

"task.executor"→event containing arguments→"v1.hello.end"

The "v1.hello.end" task may output the consolidated results from "v1.hello.world.1" and "v1.hello.world.2" and inform the task executor engine 108 that the task has reached the end of the flow. The task executor engine 108 may close the flow and the transaction may be completed.

Consider an exemplary scenario of a user-defined exception handler, as shown in FIG. 3F. To demonstrate user-defined exception handling, the task executor engine 108 may set the "exception" handler in the "v1.hello.world.1" to the "v1.hello.exception" function. The demo logic in "v1.hello.world.1" may throw an exception in every two requests. When the "v1.hello.world.1" throws an exception, the task executor engine 108 may route the exception to the "v1.hello.exception" which may output the exception status code, message, and stack trace. The "v1.hello.exception" may be an "end" task and thus the flow may be completed, as shown below:

"task.executor"→event containing arguments→"v1.hello.world.1"

"task.executor"→event containing arguments→"v1.hello.world.2"

"v1.hello.world.1"→exception event→"task.executor"

The next "join" task may not run, because there may be an exception during the execution of "fork-n-join," as shown below:

"task.executor"→error code, message, stack-trace→"v1.hello.exception" Further, an exemplary encrypted user profile data in persistent storage is shown below:

```
{
    "address":
    "KOUG+xIZzv5SSFYtLTyVdZ6NykvXkznJ3hC5IP+uBRM=",
        "name": "Hello World",
    "telephone":
    "DTIPvTqqgmAMdEZPt8ZCqgCS5AtBDNSUxKSAzGe0Lbc=",
        "id": 12345
}
```

FIG. 4 illustrates an exemplary flow diagram representation of a method 400 for managing flow-flow configurable event-driven microservices, according to an example embodiment of the present disclosure.

Referring to FIG. 4, at step 402, the method 400 may include providing, by a processor (e.g., 102) associated with the system, for each function in a sequence of steps corresponding to a transaction flow associated with a model of event-driven microservices, an address of an associated memory space, using a route name.

Further, at step 404, the method 400 may include connecting each function with another function in at least one of the memory space and a different application instance with an automatic service discovery. In an example embodiment, each function may communicate with the other function in the event-driven microservices using at least one of an in-memory event bus and a network event bus. In an example embodiment, the transaction flow may include a transaction corresponding to an instance of a flow execution defined in a configuration. The configuration may provide the transaction flow and corresponding data mapping to provide for each function, associated input and associated output without knowledge of the rest of the transaction in the model.

In an example embodiment, the method 400 may include configuring a delay tag in the transaction flow to execute the transaction in a deferred manner. The delay tag may include a fixed delay or a variable delay, as described herein above.

In an example embodiment, the flow may be generalized for at least one of a request-response RPC and an asynchronous processing technique.

In another example embodiment, the method 400 may include configuring an expiry timer as a maximum time for the transaction flow to finish executing the sequence of steps.

Referring to FIG. 4, at step 406, the method 400 may include generating at least one of a configuration file and a configuration file-like handle including the transaction flow associated with the model of event-driven microservices. Further, at step 408, the method 400 may include transporting, for the event-driven microservices, at least one of an input and an output including at least one of a message and an event including an object corresponding to a payload, in an event envelope, based on at least one of the configuration file and the configuration file-like handle. In an example embodiment, the event envelope may include at least one of headers for holding optional parameters, a body for holding the payload of the object, and essential metadata comprising at least one of a unique event ID, a correlation ID, a status code, an exception, a trace ID, and a trace path.

Furthermore, at step 410, the method 400 may include executing the sequence of steps connecting each function in at least one of a sequential mode, a pipeline mode, and a parallel mode, based on at least one of the configuration file and the configuration file-like handle.

It may be appreciated that the order in which the method 400 is described is not intended to be construed as a limitation, and any number of the described method blocks may be combined or otherwise performed in any order to implement the method 400 or an alternate method. Additionally, individual blocks may be deleted from the method 400 without departing from the present disclosure described herein. Furthermore, the method 400 may be implemented in any suitable hardware, software, firmware, or a combination thereof that exists in the related art or that is later developed. The method 400 describes, without limitation, the implementation of the system 100. A person of skill in the art will understand that method 400 may be modified appropriately for implementation in various manners without departing from the present disclosure.

Figure 5:
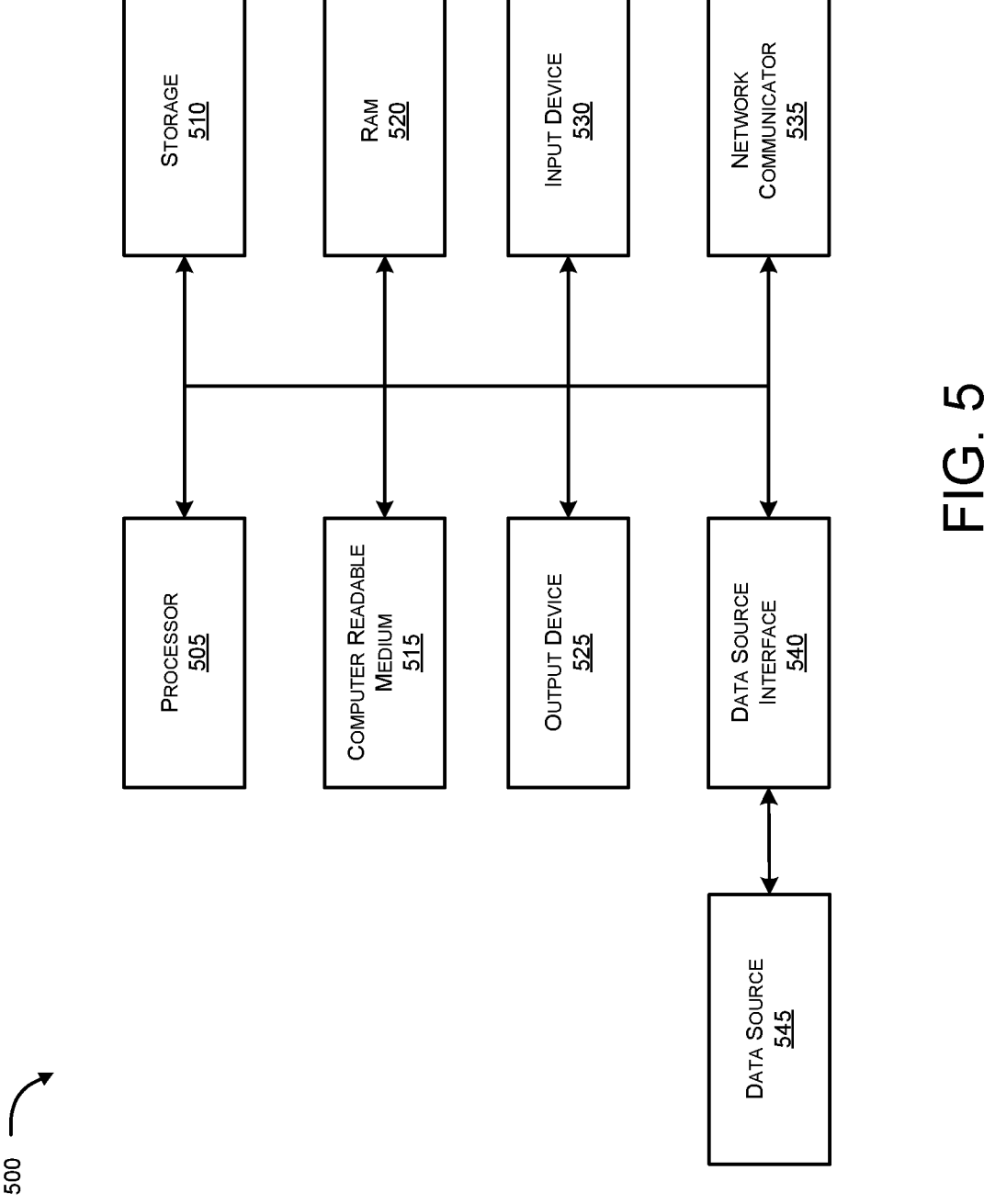
FIG. 5 illustrates a hardware platform for an implementation of the disclosed system, according to an example embodiment of the present disclosure.

FIG. 5 illustrates a hardware platform 500 for implementation of the disclosed system 100, according to an example embodiment of the present disclosure. For the sake of brevity, the construction and operational features of the system 100 which are explained in detail above are not explained in detail herein. Particularly, computing machines such as, but not limited to, internal/external server clusters, quantum computers, desktops, laptops, smartphones, tablets, and wearables which may be used to execute the system 100 or may include the structure of the hardware platform 500 may not be explained in detail herein. The hardware platform 500 may include additional components that may not be shown, and some of the components described may be removed and/or modified. For example, a computer system with multiple graphics processing units (GPUs) may be located on external-cloud platforms including Amazon Web Services, or internal corporate cloud computing clusters, or organizational computing resources.

In an example embodiment, the hardware platform 500 may be a computer system such as the system 100 that may be used with the embodiments described herein. The computer system may represent a computational platform that may include components that may be in a server or another computer system. The computer system may execute, by a processor 505 (e.g., a single or multiple processors) or other hardware processing circuit, the methods, functions, and other processes described herein. In an example embodiment, the processor 505 may be similar to the processor 102 of FIG. 1 in its functionality. The methods, functions, and other processes described herein may be embodied as machine-readable instructions stored on a computer-readable medium, which may be non-transitory, such as hardware storage devices (e.g., random access memory (RAM), read-only memory (ROM), erasable, programmable ROM (EPROM), electrically erasable, programmable ROM (EEPROM), hard drives, and flash memory). The computer system may include the processor 505 that executes software instructions or code stored on a non-transitory computer-readable storage medium 510 to perform methods of the present disclosure. The software code may include, for example, instructions to gather data and documents and analyze documents. In an example, the flow orchestration engine 106 and the task executor engine 108 may be software codes or components performing these steps.

The instructions on the computer-readable storage medium 510 may be read and stored in a storage 515 or in RAM. The storage 515 may provide a space for keeping static data where at least some instructions may be stored for later execution. The stored instructions may be further compiled to generate other representations of the instructions and dynamically stored in the RAM such as RAM 520. The processor 505 may read instructions from the RAM 520 and perform actions as instructed.

The computer system may further include an output device 525 to provide at least some of the results of the execution as output including, but not limited to, visual information to users, such as external agents. The output device 525 may include a display on computing devices and virtual reality glasses. For example, the display may be a mobile phone screen or a laptop screen. GUIs and/or text may be presented as an output on the display screen. The computer system may further include an input device 530 to provide a user or another device with mechanisms for entering data and/or otherwise interact with the computer system. The input device 530 may include, for example, a keyboard, a keypad, a mouse, or a touchscreen. Each of these output devices 525 and input devices 530 may be joined by one or more additional peripherals.

A network communicator 535 may be provided to connect the computer system to a network and in turn to other devices connected to the network including other clients, servers, data stores, and interfaces, for example. The network communicator 535 may include, for example, a network adapter such as a local area network (LAN) adapter or a wireless adapter. The computer system may include a data sources interface 540 to access a data source 545. The data source 545 may be an information resource. As an example, a database of exceptions and rules may be provided as the data source 545. Moreover, knowledge repositories and curated data may be other examples of the data source 545.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A system, comprising:
    a processor; and
    a memory coupled to the processor, wherein the memory comprises processor-executable instructions, which on execution, cause the processor to:
        provide, for each function in a sequence of steps corresponding to a transaction flow associated with a model of event-driven microservices, an address of an associated memory space, using a route name;
        connect each function with another function in at least one of the associated memory space and a different application instance with an automatic service discovery;
        generate at least one of a configuration file and a configuration file-like handle comprising the transaction flow associated with the model of event-driven microservices;
        transport, for the event-driven microservices, at least one of an input and an output comprising at least one of a message and an event comprising an object corresponding to a payload, in an event envelope, based on at least one of the configuration file and the configuration file-like handle; and
        execute the sequence of steps connecting each function in at least one of a sequential mode and a parallel mode, based on at least one of the configuration file and the configuration file-like handle.

2. The system of claim 1, wherein each function communicates with the other function in the event-driven microservices using at least one of an in-memory event bus and a network event bus.

3. The system of claim 1, wherein the transaction flow comprises a transaction corresponding to an instance of a flow execution defined in a configuration.

4. The system of claim 3, wherein the configuration provides the transaction flow and corresponding data mapping to provide for each function, associated input and associated output without knowledge of the rest of the transaction in the model.

5. The system of claim 3, wherein the processor is to configure a delay tag in the transaction flow to execute the transaction in a deferred manner, and wherein the delay tag comprises one of a fixed delay and a variable delay.

6. The system of claim 3, wherein the flow is generalized for at least one of a request-response Remote Procedure Call (RPC) and an asynchronous processing technique.

7. The system of claim 1, wherein the event envelope comprises at least one of headers for holding optional parameters, a body for holding the payload of the object, and essential metadata comprising at least one of a unique event identity (ID), a correlation ID, a status code, an exception, a trace ID, and a trace path.

8. The system of claim 1, wherein the processor is to execute the sequence of steps connecting each function in a pipeline mode, based on at least one of the configuration file and the configuration file-like handle.

9. The system of claim 1, wherein the processor is to configure an expiry timer as a maximum time for the transaction flow to finish the execution of the sequence of steps.

10. A method, comprising:
  providing, by a processor associated with a system, for each function in a sequence of steps corresponding to a transaction flow associated with a model of event-driven microservices, an address of an associated memory space, using a route name;
  connecting, by the processor, each function with another function in at least one of the associated memory space and a different application instance with an automatic service discovery;
  generating, by the processor, at least one of a configuration file and a configuration file-like handle comprising the transaction flow associated with the model of event-driven microservices;
  transporting, by the processor, for the event-driven microservices, at least one of an input and an output comprising at least one of a message and an event comprising an object corresponding to a payload, in an event envelope, based on at least one of the configuration file and the configuration file-like handle; and
  executing, by the processor, the sequence of steps connecting each function in at least one of a sequential mode and a parallel mode, based on at least one of the configuration file and the configuration file-like handle.

11. The method of claim 10, wherein each function communicates with the other function in the event-driven microservices using at least one of an in-memory event bus and a network event bus.

12. The method of claim 10, wherein the transaction flow comprises a transaction corresponding to an instance of a flow execution defined in a configuration.

13. The method of claim 12, wherein the configuration provides the transaction flow and corresponding data mapping to provide for each function, associated input and associated output without knowledge of the rest of the transaction in the model.

14. The method of claim 12, comprising configuring, by the processor, a delay tag in the transaction flow to execute the transaction in a deferred manner, wherein the delay tag comprises one of a fixed delay and a variable delay.

15. The method of claim 12, wherein the flow is generalized for at least one of a request-response Remote Procedure Call (RPC) and an asynchronous processing technique.

16. The method of claim 10, wherein the event envelope comprises at least one of headers for holding optional parameters, a body for holding the payload of the object, and essential metadata comprising at least one of a unique event identity (ID), a correlation ID, a status code, an exception, a trace ID, and a trace path.

17. The method of claim 10, comprising executing, by the processor, the sequence of steps connecting each function in a pipeline mode, based on at least one of the configuration file and the configuration file-like handle.

18. The method of claim 10, comprising configuring, by the processor, an expiry timer as a maximum time for the transaction flow to finish executing the sequence of steps.

19. A non-transitory computer-readable medium comprising machine-readable instructions that are executable by a processor to:
  provide, for each function in a sequence of steps corresponding to a transaction flow associated with a model of event-driven microservices, an address of an associated memory space, using a route name;
  connect each function with another function in at least one of the associated memory space and a different application instance with an automatic service discovery;
  generate at least one of a configuration file and a configuration file-like handle comprising the transaction flow associated with the model of event-driven microservices;
  transport, for the event-driven microservices, at least one of an input and an output comprising at least one of a message and an event comprising an object corresponding to a payload, in an event envelope, based on at least one of the configuration file and the configuration file-like handle; and
  execute the sequence of steps connecting each function in at least one of a sequential mode and a parallel mode, based on at least one of the configuration file and the configuration file-like handle.

20. The non-transitory computer-readable medium of claim 19, wherein the transaction flow comprises a transaction corresponding to an instance of a flow execution defined in a configuration, and wherein the configuration provides the transaction flow and corresponding data mapping to provide for each function, associated input and associated output without knowledge of the rest of the transaction in the model.

\* \* \* \* \*